United States Patent
Suydam

(10) Patent No.: US 11,540,496 B1
(45) Date of Patent: Jan. 3, 2023

(54) METHOD AND APPARATUS FOR INCREASING HONEY HARVEST EFFICIENCY

(71) Applicant: Stuart Suydam, Mill Creek, PA (US)

(72) Inventor: Stuart Suydam, Mill Creek, PA (US)

( * ) Notice: Subject to any disclaimer, the term of this patent is extended or adjusted under 35 U.S.C. 154(b) by 0 days.

(21) Appl. No.: 17/192,315

(22) Filed: Mar. 4, 2021

Related U.S. Application Data

(60) Provisional application No. 62/985,426, filed on Mar. 5, 2020.

(51) Int. Cl.
*A01K 59/04* (2006.01)
*A01K 59/02* (2006.01)

(52) U.S. Cl.
CPC ............ *A01K 59/04* (2013.01); *A01K 59/02* (2013.01)

(58) Field of Classification Search
CPC ........ A01K 59/04; A01K 51/00; A01K 59/02; A01K 59/06; A01K 47/00; A01K 47/06
USPC .............................................. 449/53, 54, 55
See application file for complete search history.

(56) References Cited

U.S. PATENT DOCUMENTS

| | | | | | |
|---|---|---|---|---|---|
| 1,378,371 | A | * | 5/1921 | Coveyou | A01K 59/02 449/55 |
| 2,261,529 | A | * | 11/1941 | Stoller | A01K 59/02 449/55 |
| 2,506,118 | A | * | 5/1950 | Taylor | A01K 47/06 449/2 |
| 2,520,304 | A | * | 8/1950 | Brand | A01K 59/02 210/187 |
| 3,290,705 | A | * | 12/1966 | Harrison | A01K 59/02 449/55 |
| 3,609,780 | A | * | 10/1971 | Cowen | A01K 59/02 449/55 |
| 3,671,985 | A | * | 6/1972 | Bell | A01K 59/04 449/2 |
| 3,789,443 | A | * | 2/1974 | Cowen | A01K 59/04 449/53 |
| 3,840,925 | A | * | 10/1974 | Croan | A01K 47/06 449/2 |

(Continued)

OTHER PUBLICATIONS

The Honey Warming Box Utilize to De-Crystalize Honey posted by 6 Acre Farmstead (https://www.youtube.com/watch?v=GEodLkJqv7c) (Year: 2019).*

(Continued)

*Primary Examiner* — Timothy D Collins
*Assistant Examiner* — Maria E Graber
(74) *Attorney, Agent, or Firm* — Hooker & Habib, P.C.

(57) ABSTRACT

Disclosed is a method and related apparatus for increasing the extraction efficiency of honey from honeycomb. Capped honeycomb is placed in a vessel and heated air is flowed past the honeycomb and in contact with the honeycomb. Heat is transferred from the flowing air to the honeycomb by forced convection. The honeycomb is removed from the vessel after the honeycomb reaches a desired end temperature. The heated honeycomb is then removed from the vessel, uncapped, and honey is extracted from the uncapped honeycomb. Heating the honeycomb by forced convection heats the capped honeycomb quickly to reduce the viscosity of the honey in the honeycomb for faster extraction, and enables recovery of honey from honeycombs having crystallized honey.

25 Claims, 5 Drawing Sheets

(56) References Cited

U.S. PATENT DOCUMENTS

| | | | | |
|---|---|---|---|---|
| 3,897,671 | A * | 8/1975 | Higgins | B65B 53/063 34/235 |
| 3,994,034 | A * | 11/1976 | Van Damme | A01K 47/06 449/12 |
| 4,481,687 | A * | 11/1984 | Arndt | A01K 51/00 449/56 |
| 5,069,651 | A * | 12/1991 | Arndt | A01K 51/00 449/2 |
| 5,575,703 | A * | 11/1996 | Stearns | A01K 47/06 449/13 |
| 5,895,310 | A * | 4/1999 | Otomo | A01K 51/00 449/20 |
| 6,475,061 | B1 * | 11/2002 | Huang | A01K 47/04 449/12 |
| 6,616,507 | B1 * | 9/2003 | Swaney | A01K 59/04 210/361 |
| 8,272,921 | B2 * | 9/2012 | Sinanis | A01K 47/04 449/35 |
| 9,332,739 | B2 * | 5/2016 | Al Khazim Al Ghamdi | A01K 47/06 |
| 11,129,370 | B1 * | 9/2021 | Shaw | A01K 51/00 |
| 2002/0151249 | A1 * | 10/2002 | Scheuneman | A01K 51/00 449/2 |
| 2004/0231301 | A1 * | 11/2004 | VanderTuin | B65B 53/063 432/242 |
| 2008/0064298 | A1 * | 3/2008 | Junqueira de Souza | A01K 47/06 449/2 |
| 2010/0003893 | A1 * | 1/2010 | Oliveira, Jr. | A01K 59/04 449/2 |
| 2010/0077702 | A1 * | 4/2010 | Lelie | B65B 53/063 53/442 |
| 2014/0370781 | A1 * | 12/2014 | Anderson | A01K 59/00 449/5 |
| 2015/0296751 | A1 * | 10/2015 | Arndt | A01M 1/2088 43/130 |
| 2016/0212976 | A1 * | 7/2016 | Bulanyy | A01K 51/00 449/2 |
| 2017/0064931 | A1 * | 3/2017 | Tagliaferri | A01K 47/04 |
| 2017/0360010 | A1 * | 12/2017 | Wilson-Rich | H04Q 9/02 |
| 2019/0289830 | A1 * | 9/2019 | Williams | A01K 47/00 |
| 2020/0032767 | A1 * | 1/2020 | Bassi | F03B 17/064 |
| 2020/0323177 | A1 * | 10/2020 | Drennan | A01K 29/005 |

OTHER PUBLICATIONS

Uncapping honey super frames with a heat gun posted by David Jastram (https://www.youtube.com/watch?v=9RCsBJ25ZXg) (Year: 2012).*

Gasmate Ducted Heater CH100 YouTube (https://www.youtube.com/watch?v=EOSicT9-JIY) (Year: 2019).*

Gasmate Ducted Heater CH100 Product Information Sheet (https://www.gasmate.com.au/static/uploads/files/ch100-gasmate-instructions-wfbkldmkfqdx.pdf) (Year: 2019).*

How Forced Air Central Split Systems Work—Younits.com YouTube (https://www.youtube.com/watch?v=BoQ1ascAMWc) (Year: 2012).*

* cited by examiner

METHOD AND APPARATUS FOR INCREASING HONEY HARVEST EFFICIENCY

RELATED APPLICATION

This application claims priority to and the benefit of the filing date of U.S. provisional patent application 62/985,426 filed Mar. 5, 2020 and entitled "Method and Apparatus for Increasing Honey Harvest Efficiency", which provisional application was pending on the filing date of this application and is incorporated by reference as if fully set forth herein.

FIELD OF THE DISCLOSURE

The disclosure relates generally to a method and apparatus for more efficient harvesting of honey, and more specifically, to a method and apparatus for harvesting honey that is also capable of efficiently harvesting honey that has high viscosity or has crystallized.

BACKGROUND OF THE DISCLOSURE

Rev. Lorenzo Lorraine Langstroth disclosed in his US Patent 9300 the movable frame beehive that includes a generally rectangular box or boxes (the box being referred to today as a "super") in which are hung a number of spaced-apart vertical frames. Each super has four sides enclosing the interior of the super and no top or bottom sides (although top and bottom sides may close the ends of the super while the super is in the beehive).

Langstroth-style frames in modern beekeeping are typically inches wide and 1¹⁄₁₆ inch thick. Frame heights are typically provided as deep, 9⅛ inches tall, medium, 6¼ inches tall, and shallow, 5⅜ inches tall. A super typically contains eight or ten frames. FIG. 10 illustrates in simplified form a medium super S containing ten frames F.

Bees store processed nectar forming the honey in honeycomb built on the frames. FIG. 10 illustrates a portion of honeycomb H covering one side of a frame F, the opposite side also covered by honeycomb. When the honeycomb is full the bees reduce the moisture content of the honey and cap the honeycomb with beeswax.

When it comes time to harvest the honey, supers containing frames with capped honeycomb are removed from the hive. Before extracting the honey from the frames, the frames are removed from the super and each frame is uncapped, that is, the beeswax cap is removed so that liquid honey can flow out from the honeycomb. The uncapped frames are placed in a centrifuge extractor whereby the frames spin and centrifugal force flows the honey from the frames. Examples of centrifugal extractors are disclosed in Swaney U.S. Pat. No. 6,616,507, Miramonetes US Patent Application Publication 2019034089, and Oliveira Jr US Patent Application Publication 20100003893, each of which are incorporated by reference as if fully set forth herein.

The efficiency of centrifugal extraction of honey is highly dependent on the physical state of the honey in the frames. More viscous (thicker) honey takes longer to flow from the frames than does less viscous (thinner) honey.

Furthermore, honey in a crystallized state within a frame is nearly impossible to extract. Crystallized honey can be thought of as "solid honey" that will not flow out of the frame. The solid honey can cause the centrifugal extractor to become unbalanced, leading to frame damage and even damage to the centrifugal extractor.

Attempts to return solid honey to liquid form within frames have proven unsuccessful. Heating the frames in an oven to heat the honeycomb and "melt" the solid honey is thwarted by the inability to evenly heat the frames in a timely and cost-effective manner. Solid honey is therefore fed to the bees rather than being extracted as commercially valuable liquid honey.

Thus there is a need for a more efficient method for extracting honey from honeycomb that includes more viscous honey or crystallized honey.

SUMMARY OF THE DISCLOSURE

Disclosed is a more efficient method and related apparatus for extracting honey from honeycomb that includes mor viscous honey or crystallized honey. The method can be applied to honeycomb on frames within supers without the need to remove the frames from the supers.

An embodiment of a method for heating capped honeycomb prior to extracting honey from the honeycomb in accordance with this disclosure includes placing the honeycomb in a vessel and flowing heated air through the vessel by forced convection, the heated air in contact with the honeycomb in the vessel. Heat transfers from the flowing heated air in contact with the honeycomb to the honeycomb, thereby increasing the temperature of the honeycomb. The honeycomb is removed from the vessel after the honeycomb has reached a desired end temperature.

Using forced convection to transfer heat into the honeycomb provides for much more efficient transfer of heat into the honeycomb. The heated air is preferably supplied at a temperature of between 90 degrees Fahrenheit and 130 degrees Fahrenheit, depending on the expected room-temperature viscosity of the honey in the honeycomb and whether crystallized honey is also present. It has been found that the honeycomb can reach substantially the temperate of the air after about between an hour and an hour-and-one-half exposure to the heated air.

The forced convection can be generated by a fan disposed outside of the vessel. By placing the fan outside of the vessel, the vessel does not need to be sized to contain the fan, the fan can be externally powered, and the fan mechanical components is not being heated by the air in the vessel. This enables more flexibility in fan selection for more efficient heating, and longer fan life.

The air in embodiments of the disclosed method can be heated by flowing the air past an external heat exchanger that heats the air prior to the heated air flowing into the vessel. Placing the heat exchanger outside of the vessel also means the vessel does not have to be sized to include a heat exchanger. The heat exchanger can be independently sized and configured to optimize heating of the air. In embodiments the heat exchanger can be a water-to-air heat exchanger.

The honeycomb can be disposed on frames held in supers without the need to remove the frames from the supers. Supers can be vertically stacked, enabling the heated air in the vessel to flow vertically through the stacks and along the opposite sides of the frames in the supers. By not having to remove the frames from the stacks during heating, the supers can be stacked on a pallet and easily moved by forklift to or from the vessel.

In embodiments of the method, the vessel can be an oven or hot box. The honeycomb is placed in the hot box for heating and removed from the hot box after reaching the desired temperature.

In other embodiments of the method, the vessel can be a hot air tunnel. A conveyor can move the honeycomb through the hot air tunnel, the conveyor speed and tunnel air temperature being selected that the honeycomb reaches the desired temperature upon emerging from the hot air tunnel. The hot air tunnel enables multiple pallets to be located in the tunnel simultaneously for batch processing of honeycomb.

Other objects and features of the disclosure will become apparent as the description proceeds, especially when taken in conjunction with the accompanying drawing sheets illustrating one or more illustrative embodiments.

DETAILED DESCRIPTION

Figure 1:
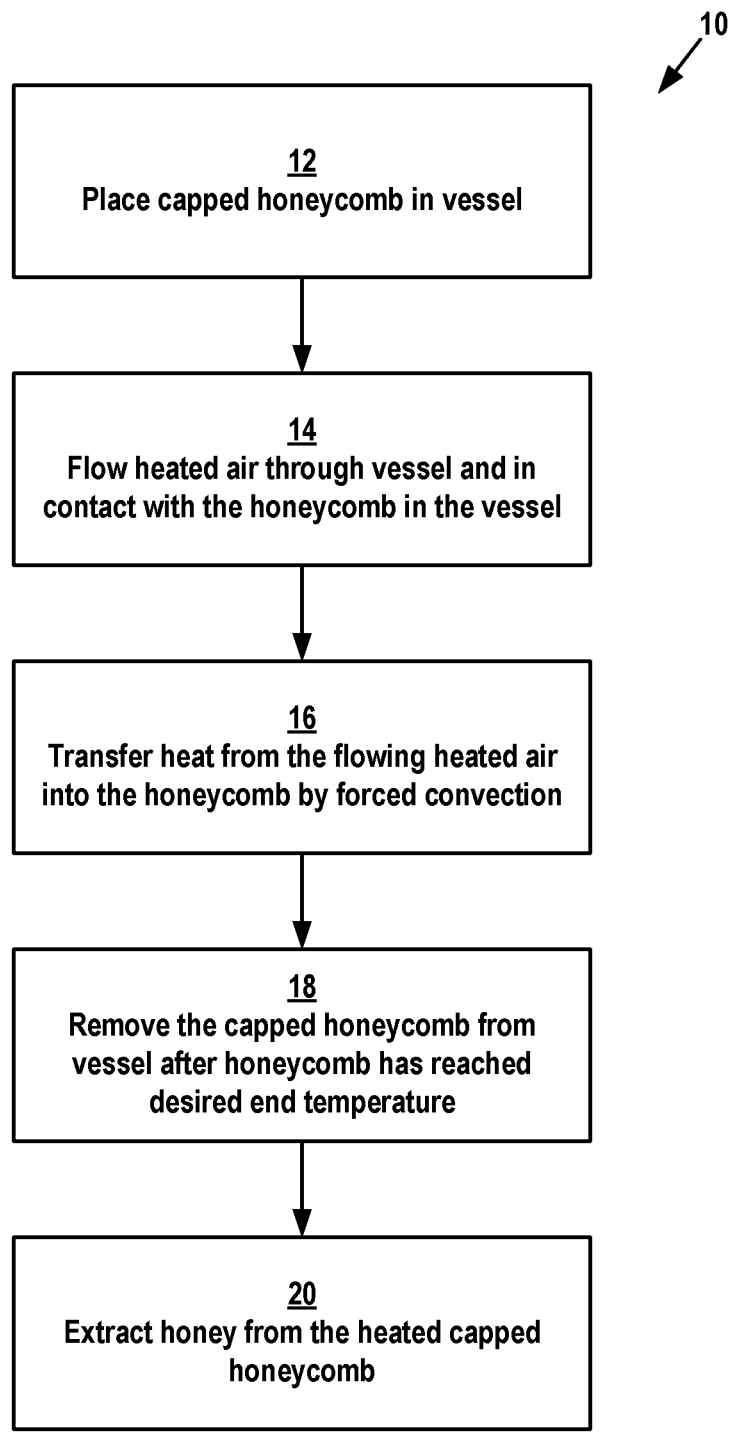
FIG. 1 illustrates an embodiment of the method for extracting honey from a honeycomb in accordance with this disclosure.

A method 10 for extracting honey from capped honeycomb is illustrated in FIG. 1. The method includes the step 12 of placing the capped honeycomb in a vessel, the step 14 of flowing heated air through the vessel with the honeycomb in the vessel by forced convection and thereby placing the honeycomb in contact with the heated and moving air, the step 16 of transferring heat into the honeycomb in the vessel by heat transfer from the moving air in contact with the honeycomb for a sufficient time to warm the honey in the honeycomb to a desired temperature, the step 18 of removing the heated honeycomb from the vessel, and the step 20 of extracting honey from the heated capped honeycomb.

The step 20 of extracting honey from the heated honeycomb can include the steps of uncapping the honeycomb and then extracting the honey from the uncapped honeycomb in a conventional manner, such as by use of a centrifugal extractor.

Preheating the honeycomb prior to uncapping and extracting the honey from the honeycomb reduces the viscosity of the honey in the honeycomb, enabling the honey to flow faster from the honeycomb during extraction. The viscosity of different honeys at a given temperature can vary depending on the nectar making the honey, the honey moisture content, and the like. Typically the honey is heated in step 16 to an end temperature of between degrees Fahrenheit and 130 degrees Fahrenheit, and most typically to an end temperature of between 95 degrees Fahrenheit and 120 degrees Fahrenheit, whereby the heated honey has a low enough viscosity to easily flow from the honeycomb during extraction. The end temperature can be selected based on the room-temperature viscosity of the honey; the more viscous the honey at room temperature, usually the higher the desired end temperature.

If the honeycomb has crystallized honey, preheating the honeycomb in accordance with the method 10 to a temperature typically of between 95 degrees Fahrenheit and 115 degrees Fahrenheit will convert the honey back to liquid form, enabling extraction of honey from the formerly solid honey.

Generally step 16 takes between about an hour and one-and-one-half hours for the honeycomb to reach a uniform desired end temperature. It has been found that exposing the honeycomb to the heated air for this period of time does not over-dry the honey for extraction. If desired, the step 16 can include flowing heated and humidified air into the vessel to further resist over-drying the honey while heating the honeycomb to the desired end temperature.

Wax melts at a temperature of between 140 degrees and 150 degrees Fahrenheit and the honeycomb is not heated to a temperature that melts the wax.

The heated air flowing past the frames transfers heat into the honeycomb and honey by forced convection. Heat transfer into the honeycombs by forced convection transfers heat into the honey and warms the honey much more efficiently than would heat transfer by natural convection used when storing the supers and frames in a room maintained at an elevated temperature prior to extraction.

Figure 4:
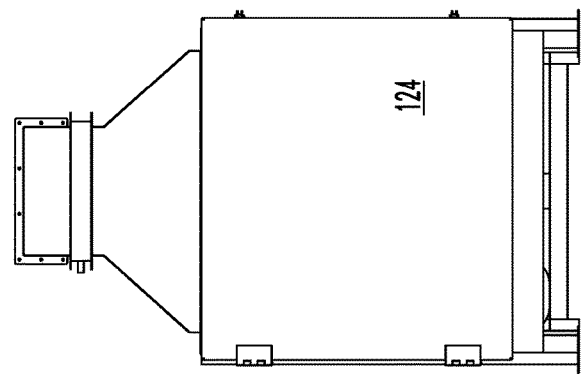
FIGS. 3 and 4 are top and end views respectively of the apparatus shown in FIG. 2.
Figure 3:
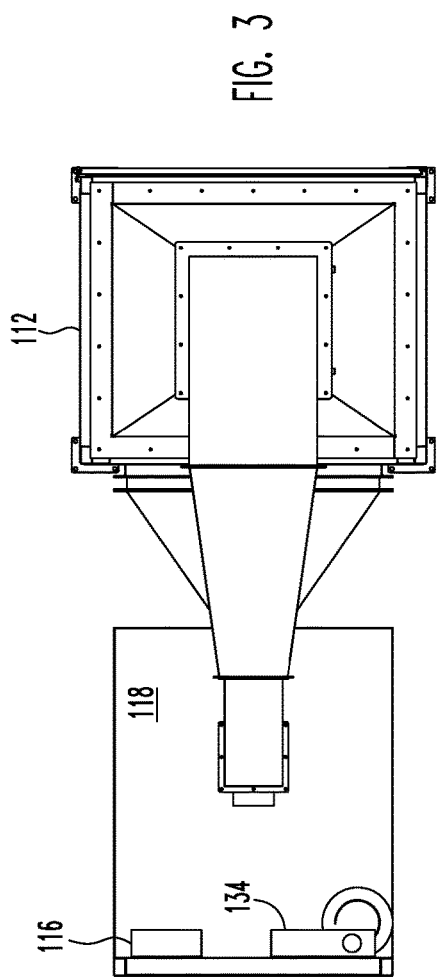
Figure 2:
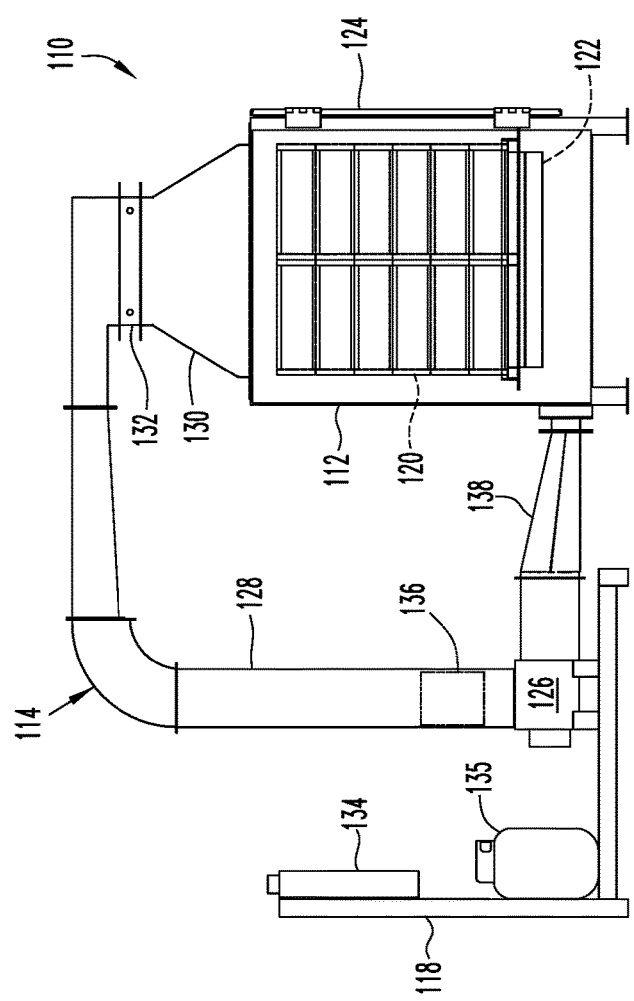
FIG. 2 is a front view of a first embodiment apparatus for preheating honeycomb prior to extracting honey from the honeycomb in accordance with this disclosure.
Figure 5:
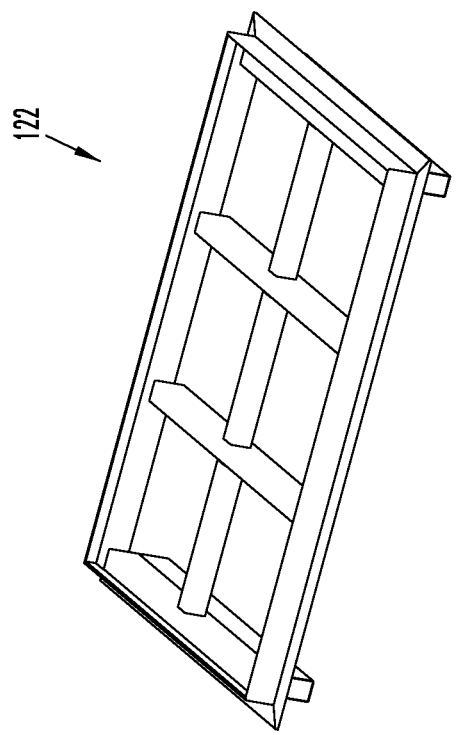
FIG. 5 is a perspective view of a pallet used with the apparatus shown in FIG. 2.
Figure 8:
FIGS. 6, 7, and 8 are a top view, side view, and end view respectively of the pallet shown in FIG. 5.
Figure 6:
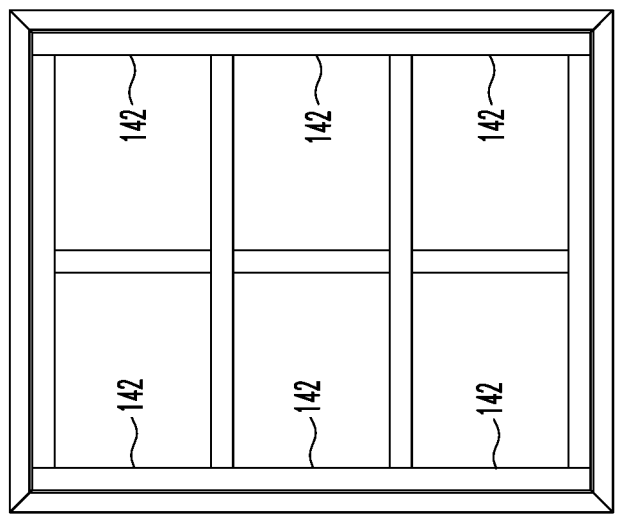
Figure 7:

FIGS. 2-4 illustrate a first embodiment apparatus 110 for preheating capped honeycomb prior to extracting honey from the honeycomb in accordance with the disclosed method. When used to preheat honeycomb on Langstroth-type frames the illustrated apparatus 110 enables preheating the capped honeycomb without removing the frames from the supers.

The apparatus 110 includes a hot box or oven 112. During operation of the apparatus 110, heated and optionally humidified air flows through the hot box 112 by operation of a forced-air convection system 114. The hot box 112 may have insulated walls to resist heat transfer between the hot box 112 and the ambient. The desired air temperature and air flow rate of the forced-air convection system 114 is set and automatically controlled through a control box 116. Components of the forced-air convention system 114 and the control box 116 are mounted on an apparatus frame 118.

FIG. 2 illustrates the hot box 112 as containing a number of stacked Langstroth-type supers 120. The supers 120 are carried on a pallet 122 that is also placed inside the hot box 112. The hot box 112 includes a sealable door 124 that opens and enables a forklift to move the pallet 122 carrying the stacked supers 120 into or out of the hot box 112.

The forced-air convection system 114 is described next. The forced-air convection system 114 includes a circulation fan 126 mounted on the apparatus frame 118 to one side of the hot box 112. The illustrated circulation fan 126 discharges air at a rate of between 5,000 CFM-10,000 cubic feet per minute into an intake air duct 128. The intake air duct 128 then flows the air to an intake hood 130 mounted on top of the hot box 112. The intake hood 130 discharges a vertical flow of air into the hot box 112 and expands the cross sectional area of the air flow such that the air flow flows over the entire top of the stacked supers 120 in the hot box 112.

The rate of air flow discharged from the circulation fan 126 is controlled by process control circuitry in the control box 116. The intake air duct 128 and/or the intake hood 130 may also include a damper operable to control the air flow through the intake air duct 130 and controlled by process control circuitry in the control box 116.

Disposed between the air duct 128 and the intake hood 130 is a water-to-air heat exchanger 132. The illustrated heat exchanger 132 is a 200,000 BTU heat exchanger that is about 24 inches square. The heat exchanger 132 receives hot water heated by a recirculating propane hot water heater 134 fueled by a propane tank 135. To simplify the drawings, gas lines between the water heater 134 and the propane tank 135 and water lines extending between the heat exchanger 132 and the hot water heater 134 for recirculating the hot water are not shown in the drawings.

The heat exchanger 132 heats the air discharged from the heat exchanger and into the intake hood 130 to a temperature of typically between 90 degrees Fahrenheit and 130 degrees Fahrenheit for warming the honeycomb as was discussed previously above. The temperature of the water required to achieve the desired air temperature out of the heat exchanger 132 is also controlled by process control circuitry in the control box 116.

The forced-air convection system 114 may include an air humidifier 136 (shown in phantom lines) if it is desired to humidify the air flowing through the hot box 112. The humidifier 136 may be located in the intake air duct 128 or the intake hood 130 to humidify the air flowing into the hot box 112. The humidity of the air is also controlled by process control circuitry in the control box 116.

The forced-air convection system 114 further includes an exhaust duct 138 extending from the bottom portion of the hot box 112 to the air intake of the circulation fan 126. The exhaust duct 138 draws air out of the hot box 112 and flows the air to the circulation fan 126 to complete the flow circuit and enable recirculation of the heated air flowing through the hot box 12.

The control box 116 includes process control circuitry (not shown) that controls operation of the apparatus 110. The process control circuitry is connected to sensors (not shown) such as air flow and water flow sensors, thermostats, humidity sensors, and the like necessary for automatic control of the apparatus 110. The control box 116 may further include a control panel or display 140 that enables input of desired operating parameters (for example, the desired temperature and flow rate of air passing through the hot box 112) and displays the operating parameters of the apparatus 10 while in use (for example, a timer or clock, sensor values, and the like).

The supers 120 are stacked on the pallet 122 (see FIGS. 5-8) prior to placing the pallet 122 in the hot box 112. The illustrated supers 120 are Langstroth-type supers having vertically hanging frames supported on the top of the supers. The supers 120 have no tops or bottoms and are arranged in vertically aligned stacks with the frames in the supers of each stack also in vertical alignment with adjacent lower and/or upper frames in the stack. An advantage of Langstroth-type supers and frames is that there is a large amount of honeycomb surface area for heat transfer and adequate room between frames for forced-convection air flow between frames and along the frames, and so the supers can be removed from the beehive and stacked without the need to move or rearrange frames.

The illustrated pallet 122 (shown separately in FIGS. 5-8) is made of steel and is designed to support six stacks of supers 120 in a side-by-side 3 by 2 base arrangement, each stack supported on a respective rectangular support 142 defined by the pallet 122. Each support 142 has an open center to not obstruct air flowing through the pallet while the pallet is in the hot box 112. The stacked pallet 122 may weigh up to about 2500 pounds.

The pallet 122 stacked with supers 120 is placed in the hot box 112. The apparatus 110 is then operated to flow air heated at between 90 degrees Fahrenheit and 130 degrees Fahrenheit through the hot box for typically between about one hour and about one-and-one-half hours to heat the honeycomb on both sides of the frames in the supers to the desired end temperature. The air flows vertically between the frames of the supers and along both sides of the frames in the supers to transfer heat by forced convection heat transfer from the air to the honeycombs to uniformly heat the honey in all the honeycombs in the supers.

After the honeycombs are heated the pallet 122 is removed from the hot box 112 and the heated honey is extracted from the supers.

Figure 9:
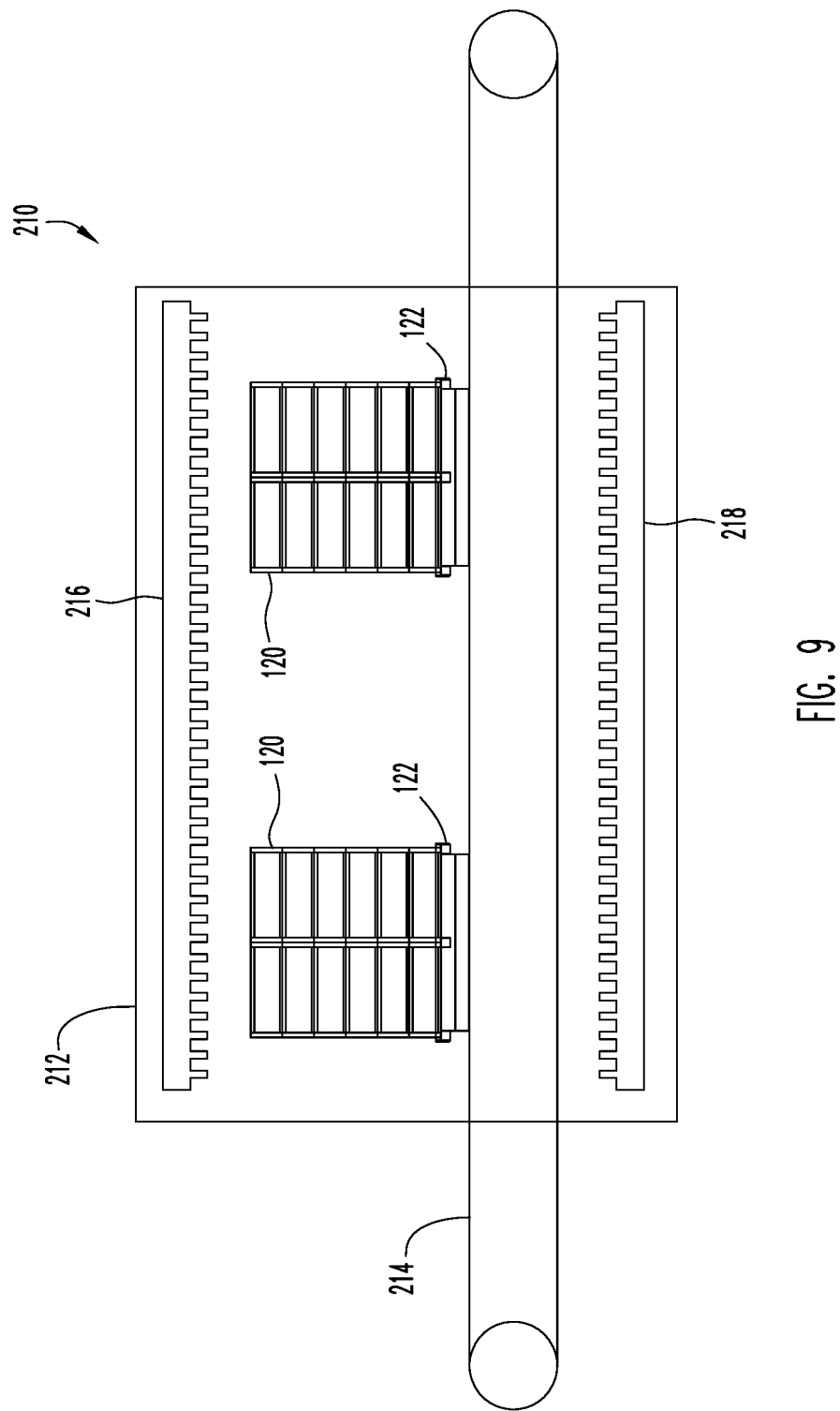
FIG. 9 is a schematic sectional side view of a second embodiment apparatus for preheating honeycomb prior to extracting honey from the honeycomb in accordance with this disclosure.
Figure 10:
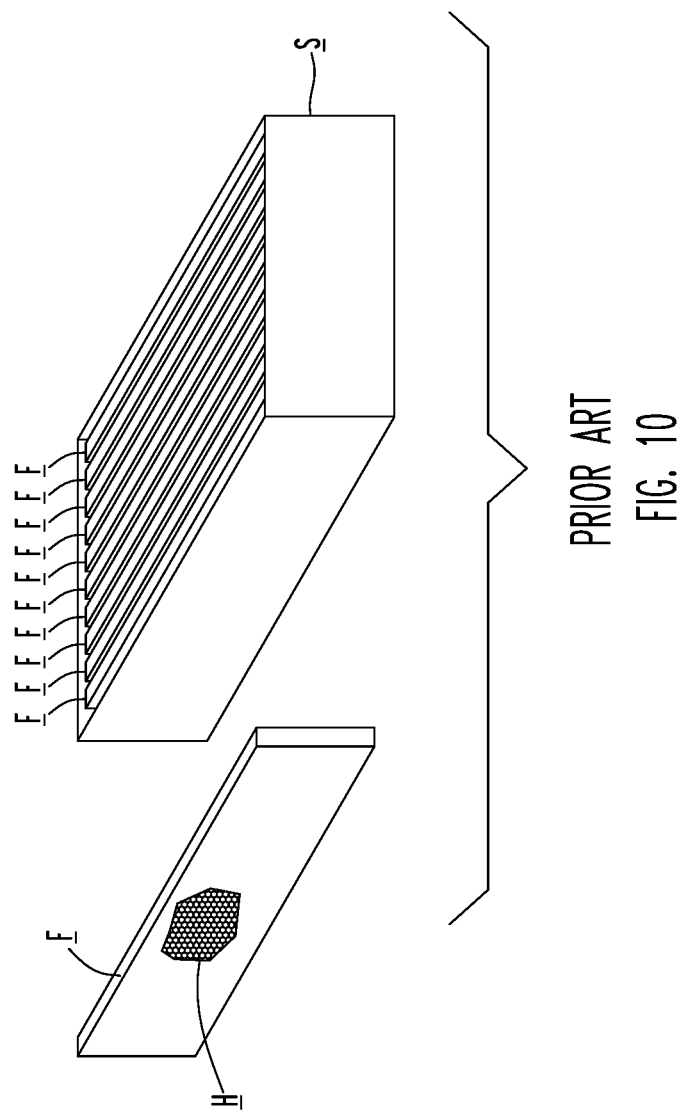
FIG. 10 illustrates a frame and a super containing ten frames.

FIG. 9 illustrates a second embodiment apparatus 210 for preheating capped honeycomb prior to extracting honey from the honeycomb in accordance with the disclosed method. The second apparatus 210 is intended to operate in a "continuous" mode rather than the "batch" mode of operation of the first embodiment apparatus 110.

The apparatus 210 includes hot air tunnel 212 and a horizontal axial conveyor belt 214 extending through the hot air tunnel 212. Disposed and extending along an upper side of the hot air tunnel 212 is a hot air discharge manifold 216 that discharges vertical flows of heated air from a number of nozzles that are located over the conveyor belt. Dispose and extending along a lower side of the hot air tunnel 212 is an exhaust manifold 218 below the conveyor belt that discharges air from the hot air tunnel.

Hot air tunnels are commonly used for applying heat shrink wraps that cover goods on a pallet, drying items, and the like. Hot air tunnel construction including the requisite fans, heaters, conveyor drives, controls, etc. that can be modified or adapted for use with the apparatus 210 are disclosed in Higgens U.S. Pat. No. 3,897,671, Vandertuin et al. US Patent Application Publication 20040231301, and Lelie US Patent Application Publication US 20100077702, each of which are incorporated by reference as if fully set forth herein.

FIG. 9 illustrates two pallets 122 stacked with supers 120 in the hot air tunnel 212 and being carried on the conveyor belt 214 through the hot air tunnel 212. Heated air discharged from the discharge manifold 216 flows vertically through the stacked supers 220. The length of the hot air tunnel 212 and the conveying speed of the conveyor belt 214 are selected so that the honeycomb in the supers reach the desired end temperature by the time the pallets 122 pass through the hot air tunnel 212 and are discharged from the tunnel.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, methods for heating the air or water (including, for example, electrical heating), operating ranges and the like, environment of use, type and number of supers and frames being heated together, use of a pallet to support stacked supers, the number and arrangement of stacked supers or frames, and the like, as well as such changes and alterations that fall within the purview of the following claims.

What is claimed is:

1. A method for heating capped honeycomb capped by beeswax and containing honey in the honeycomb prior to uncapping the honeycomb and extracting the honey from the uncapped honeycomb, the method comprising the steps of:
   (a) placing the honeycomb containing honey and beeswax capping the honeycomb in a vessel that does not contain bees while performing steps (a), (b), and (c);
   (b) flowing heated air having an air temperature less than the melting temperature of the beeswax through the vessel by forced convection, the heated air in contact with the honeycomb in the vessel;
   (c) transferring heat from the flowing heated air in contact with the honeycomb in the vessel and thereby increasing the temperature of the honeycomb without melting or otherwise removing the beeswax capping the honeycomb,
   (d) removing the capped honeycomb from the vessel after the honeycomb has reached a desired end temperature; and
   (e) uncapping the heated honeycomb while the temperature of the honeycomb is at an increased temperature from performing steps (a)-(d).

2. The method for heating capped honeycomb of claim 1 wherein the heated air in the vessel has a temperature of between 90 degrees Fahrenheit and 130 degrees Fahrenheit.

3. The method for heating capped honeycomb of claim 1 wherein the honeycomb is left in the vessel for not more than one-and-one-half hours.

4. The method for heating capped honeycomb of claim 1 wherein step (b) comprises the step of:
   (f) operating a fan outside of the vessel, the fan generating the forced convection of the air.

5. The method for heating capped honeycomb of claim 1 wherein the fan recirculates the hot air flowing through the vessel.

6. The method for heating capped honeycomb of claim 1 wherein step (b) comprises the step of:
   (f) flowing the air past a heat exchanger and transferring heat from the heat exchanger into the air prior to the air flowing into the vessel.

7. The method for heating capped honeycomb of claim 1 wherein the vessel is a hot box.

8. The method for heating capped honeycomb of claim 1 wherein the vessel is a hot air tunnel.

9. The method for heating capped honeycomb of claim 8 wherein step (a) comprises the step of placing the honeycomb on a conveyor and the conveyor conveying the honeycomb into the hot air tunnel, and step (d) comprises the step of the conveyor conveying the heated honeycomb out of the hot air tunnel.

10. The method for heating capped honeycomb of claim 9 wherein step (d) is performed after the conveyor has conveyed the honeycomb through the hot air tunnel for not more than one-and-one-half hours.

11. The method for heating capped honeycomb of claim 8 wherein the honeycomb when in the hot air tunnel is disposed on a plurality of Langstroth-style frames disposed in a plurality of supers, the plurality of supers forming one or more stacks of vertically stacked supers.

12. The method for heating capped honeycomb of claim 1 wherein the honeycomb is disposed on a Langstroth-style frame extending vertically in a super, and step (b) comprises the step of:
   (f) flowing the heated air vertically through the super and in contact with both sides of the frame.

13. The method for heating capped honeycomb of claim 12 wherein the honeycomb when in the vessel is disposed on a plurality of Langstroth-style frames disposed in a plurality of supers, the plurality of supers forming one or more stacks of vertically stacked supers.

14. The method for heating capped honeycomb of claim 1 wherein the honeycomb when in the vessel is disposed on a plurality of Langstroth-style frames disposed in a plurality of supers, the plurality of supers forming one or more stacks of vertically stacked supers;
   step (b) comprises the steps of:
      (f) operating a fan outside of the vessel, the fan generating the forced convection of the heated air, and
      (g) flowing the air past a heat exchanger and transferring heat from the heat exchanger into the air to heat the air prior to the heated air flowing into the vessel; and
   step (c) comprises the step of:
      (h) flowing the heated air vertically through the one or more stacks of supers and along opposite sides of the frames in the supers.

15. The method for heating capped honeycomb of claim 14 wherein the vessel is a hot box.

16. The method for heating capped honeycomb of claim 15 wherein step (a) comprises the step of opening a door of the hot box to place the honeycomb in the hot box, and step (d) comprises the step of opening the door of the hot box to remove the honeycomb from the hot box.

17. The method for heating capped honeycomb of claim 15 wherein the one or more stacks of supers are supported on a pallet, the heated air flowing through the pallet.

18. The method for heating capped honeycomb of claim 15 wherein the heated air in the hot box has a temperature of between 90 degrees Fahrenheit and 130 degrees Fahrenheit.

19. The method for heating capped honeycomb of claim 1 further comprising the step of:
   (f) extracting honey from the uncapped honeycomb.

20. The method for heating capped honeycomb of claim 19 wherein step (f) comprises centrifugal extraction of honey from the uncapped honeycomb.

21. A method for heating capped honeycomb prior to extracting honey from the honeycomb, the method comprising the steps of:
   (a) placing the honeycomb in a vessel, the honeycomb when in the vessel being disposed on a plurality of Langstroth-style frames disposed in a plurality of supers, the plurality of supers forming one or more stacks of vertically stacked supers;
   (b) flowing heated air through the vessel by forced convection, the heated air in contact with the honeycomb in the vessel;
   (c) transferring heat from the flowing heated air in contact with the honeycomb in the vessel and thereby increasing the temperature of the honeycomb; and
   (d) removing the honeycomb from the vessel after the honeycomb has reached a desired end temperature;
   wherein step (b) comprises the steps of:
   (e) operating a fan outside of the vessel, the fan generating the forced convection of the heated air, and
   (f) flowing the air past a heat exchanger and transferring heat from the heat exchanger into the air to heat the air prior to the heated air flowing into the vessel; and
   step (c) comprises the step of:

(g) flowing the heated air vertically through the one or more stacks of supers and along opposite sides of the frames in the supers.

22. The method for heating capped honeycomb of claim 21 wherein the vessel is a hot box.

23. The method for heating capped honeycomb of claim 22 wherein step (a) comprises the step of opening a door of the hot box to place the honeycomb in the hot box, and step (d) comprises the step of opening the door of the hot box to remove the honeycomb from the hot box.

24. The method for heating capped honeycomb of claim 22 wherein the one or more stacks of supers are supported on a pallet, the heated air flowing through the pallet.

25. The method for heating capped honeycomb of claim 22 wherein the heated air in the hot box has a temperature of between 90 degrees Fahrenheit and 130 degrees Fahrenheit.

* * * * *